United States Patent
Lee et al.

(10) Patent No.: US 6,493,797 B1
(45) Date of Patent: Dec. 10, 2002

(54) MULTI-TAG SYSTEM AND METHOD FOR CACHE READ/WRITE

(75) Inventors: Chan Lee, Portland, OR (US); Richard A. Weier, Bolton, MA (US); Robert F. Krick, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,431

(22) Filed: Mar. 31, 2000

(51) Int. Cl.[7] .............................................. G06F 12/00
(52) U.S. Cl. ...................... 711/118; 711/136; 711/144; 711/145
(58) Field of Search .................. 711/118, 200, 711/206, 208, 209, 221, 136, 144, 145

(56) References Cited

U.S. PATENT DOCUMENTS

| | | | | |
|---|---|---|---|---|
| 5,894,575 A | * | 4/1999 | Levine et al. ............... | 711/117 |
| 5,999,721 A | * | 12/1999 | Colglazier .................. | 703/14 |
| 6,052,700 A | * | 4/2000 | Eckard et al. .............. | 708/111 |
| 6,185,675 B1 | * | 2/2001 | Kranich et al. ............. | 711/125 |
| 6,272,602 B1 | * | 8/2001 | Singhal et al. .............. | 711/144 |
| 6,425,055 B1 | * | 7/2002 | Sager et al. ................ | 711/118 |

OTHER PUBLICATIONS

Rotenberg et al., "A Trace Cache Microarchitecture and Evaluation," IEEE, pp. 111–120, Feb. 1999.*
Patel et al., "Evaluation of Design Option for the Trace Cache Fetch Mechanism," IEEE, pp. 193–204, Feb. 1999.*

* cited by examiner

Primary Examiner—Matthew Kim
Assistant Examiner—Stephan Elmore
(74) Attorney, Agent, or Firm—Kenyon & Kenyon

(57) ABSTRACT

A method and device are provided for reading data from a trace cache in a manner that reduces the time and power consumed by such an operation. A mini-tag is provided for comparing to a requested address to reduce the amount of data that must be read. Mini-tag read and compare operations may be performed in parallel to a full tag read operation, and a data read operation of only the data identified by a matching mini-tag may be performed in parallel to a full tag compare operation. A victim selection method for writing data into the trace cache is used to maintain the uniqueness of the mini-tags.

17 Claims, 8 Drawing Sheets

MULTI-TAG SYSTEM AND METHOD FOR CACHE READ/WRITE

BACKGROUND OF THE INVENTION

The present invention relates to a system and method for reducing time and power consumption required for reading data from a cache. Specifically, a comparison method using both mini-tags and full tags is provided for reading data from the cache, and a victim selection method is provided for writing data into the cache, in order to reduce the time and power consumption required for reading data from the cache.

In a computer system, a cache stores data in order to decrease data retrieval times for a processor. More particularly, a cache stores specific subsets of data in high-speed memory. When a processor requests a piece of data, the system checks the cache first to see if the data is stored within the cache. If it is available, the processor can retrieve the data much faster than if the data was stored in other computer readable media such as random access memory, a hard drive, CD ROM, or floppy disk.

One particular type of cache is referred to as a trace cache. A trace cache is responsible for building, caching, and delivering instruction traces to a processor. In one type of trace cache, instructions are stored as blocks of decoded micro-operations ("micro-ops"). These blocks are known as "traces" and are, in this example, the only units of instructions allowed to be accessed by a processor. Traces are distinguishable from one another only by identifying information found at the beginning of each trace known as a "trace head." Generally, traces may be terminated upon encountering an indirect branch or by reaching one of many preset threshold conditions, such as the number of conditional branches in the trace or the number of total micro-ops in the trace.

A cache may be organized into rows and columns. For example, a known type of trace cache has 256 rows and 16 columns. The 16 columns alternate between those containing data and those containing "tags" identifying the data. Each tag may be, for example, 24 bits. In a prior trace cache addressing scheme, a processor uses a requested address to locate data in the trace cache. In this prior system, bits 3–10 of a 32 bit requested address are referred to as a "set address," which is used to select one of the 256 rows of the trace cache. The remaining bits in this address serve as a requested tag for identifying the data entry sought by the processor.

A flow diagram for the prior technique is shown in FIG. 1. During a read operation using this prior technique, once a particular row in the cache has been selected (step 11), all of the tags in that row are read (step 12), and a tag comparison operation is performed (step 13) to determine whether there is a matching tag in the selected row. If it is determined that none of the tags matches ("hits") the tag of the requested address in step 14, a write operation is performed in step 15. This write operation may include, for example, a pseudo-least recently used ("pseudo-LRU") victim selection, as known in the art. If a tag hits in step 14, the data identified by the tag is read from the trace cache (step 16), is validated (step 17), and the process ends in step 18. Since this process requires that all the tags from the selected row be read from the trace cache and compared before any data is read, it is slow, and a faster process may be more desirable.

A flow diagram for a second prior technique is shown in FIG. 2. During a read operation using this second prior technique, once a particular row in the cache has been selected (step 20), all of the tags in that row, along with their associated data entries, are read in parallel (steps 21 and 22), and a tag comparison operation is performed (step 23). A tag comparison operation is performed (step 23) to determine whether there is a matching tag in the selected row. If it is determined that none of the tags "hits" the tag of the requested address in step 24, a write operation, including, e.g., a pseudo-LRU victim selection is performed in step 25. If a tag does hit in step 24, the data identified by the requested address and matching tag is multiplexed out of all the read entries from the selected row using, in this case, an 8-to-1 multiplexer. The data is validated in step 27 and the process terminates in step 28.

In this second prior technique, the reason that all of the data entries for an accessed row must be read from the cache is that the technique does not allow the processor to recognize beforehand which of the data entries is the desired one, so that a read of all of the data entries for that row becomes necessary. Two significant problems afflict this trace cache reading technique, both of which are due, in part, to the large size of each data entry. First, although this technique may be faster than the first technique (since the data is read from the trace cache in parallel to the reading of the tags, as opposed to the first technique where the data is not read until after a tag hit is found) it is still time consuming. Because each data entry in this example is 300 bits long, reading out every data entry for an accessed row (an operation which yields a total of 2,400 bits in this case) is very time consuming. As a corollary to this effect, the excessive amount of time reading out these data entry bits, and the storage (e.g., in a latch) of this high quantity of data, consumes power that could otherwise be applied to other important tasks.

DETAILED DESCRIPTION

The present invention relates to a system and method for reducing the time and power consumption required for reading data from a cache such as a trace cache. With the use of an abridged code referred to as a "mini-tag," a trace cache read operation avoids the need to arrive at the desired information by first reading out an entire collection of data entries for an addressed row and then multiplexing out the desired data entry. Moreover, by performing a victim selection operation to select which portion of a trace cache is to be written over with data that a prior read operation revealed as being absent from the cache, each mini-tag within each addressed row of the trace cache is ensured to be unique and can thereby serve as a basis for a trace cache reading operation.

Figure 1:
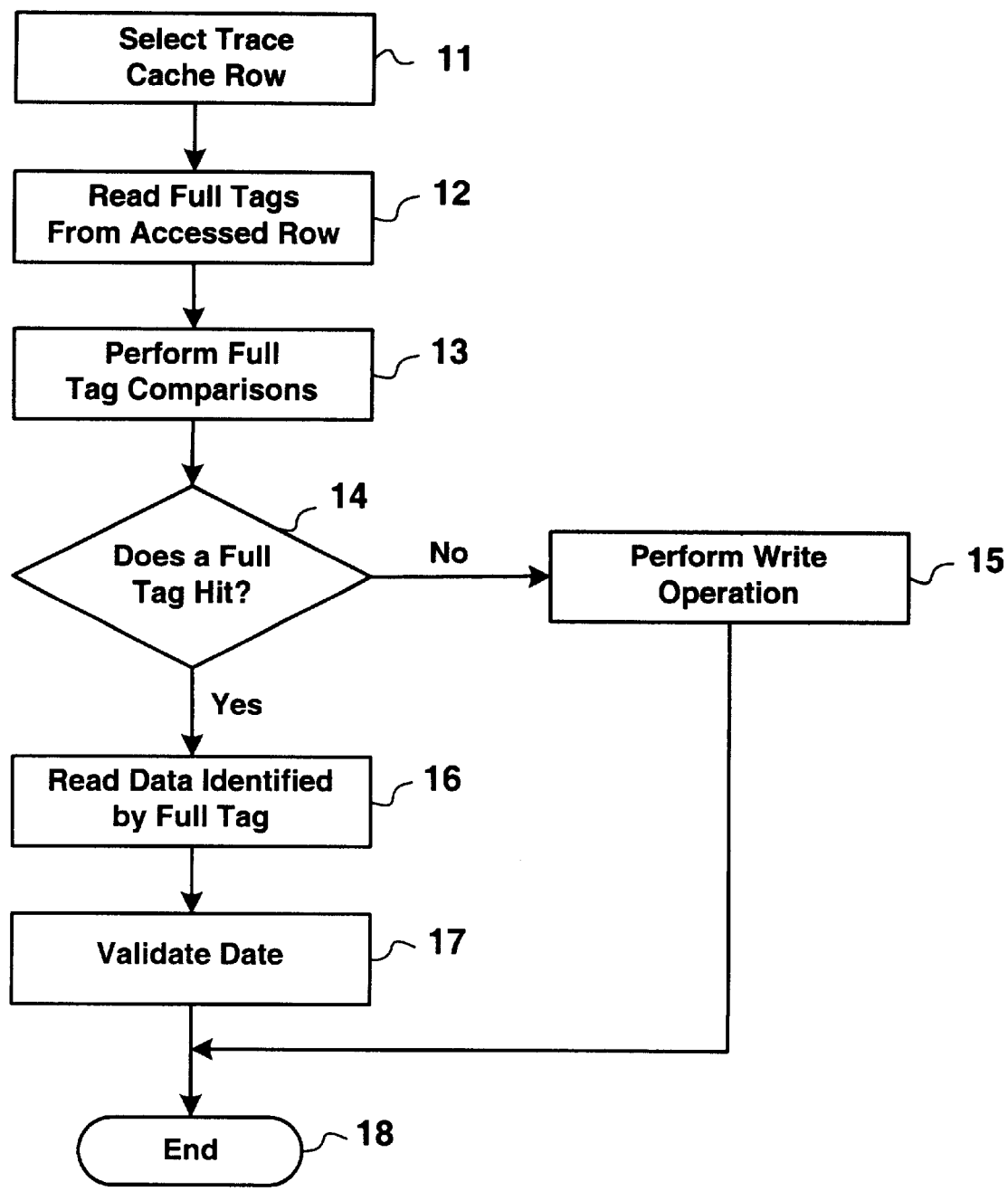
FIG. 1 is a flow diagram of a prior art technique for reading data from a trace cache.
Figure 2:
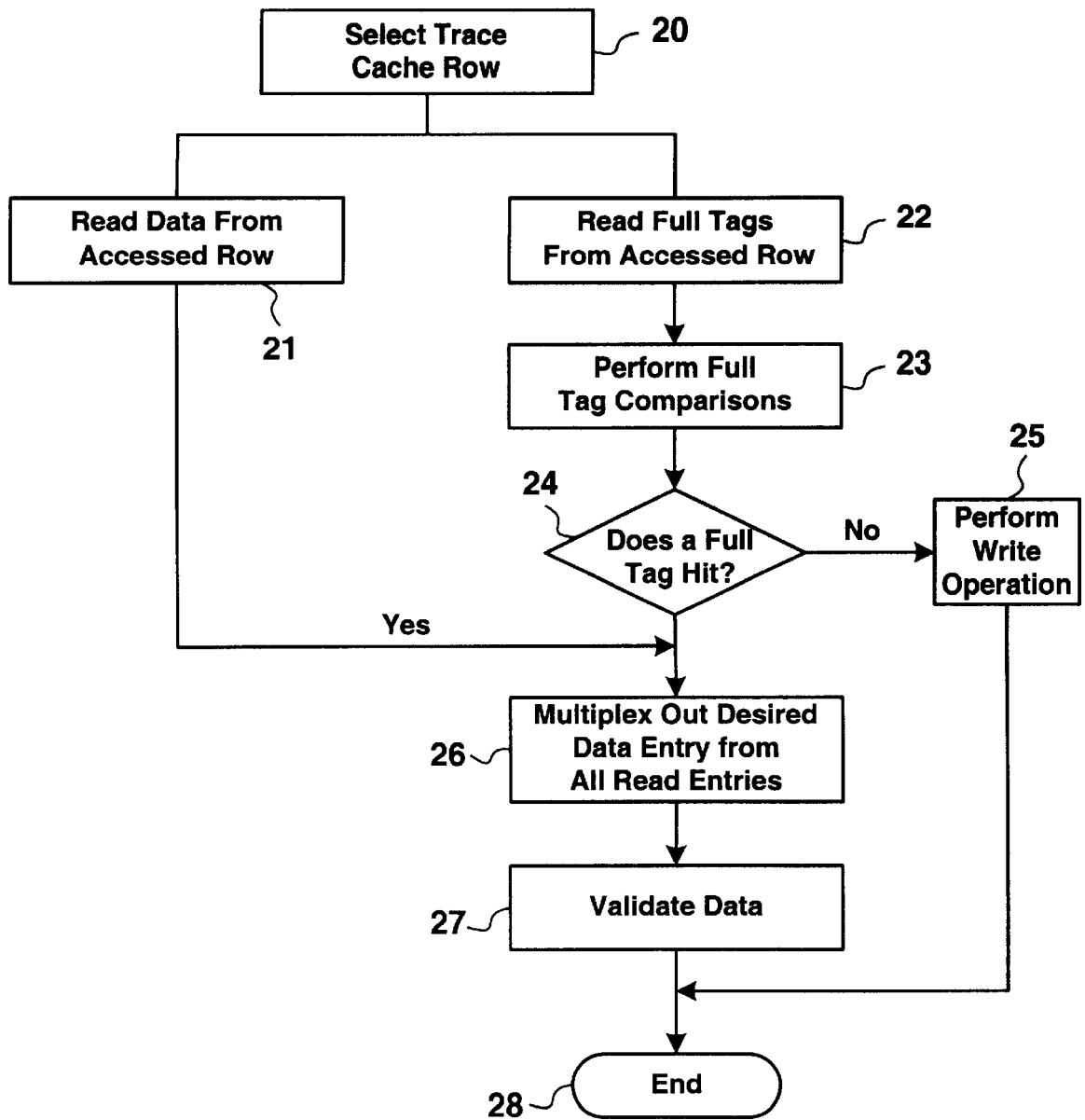
FIG. 2 is a flow diagram of a second prior art technique for reading data from a trace cache.
Figure 3:
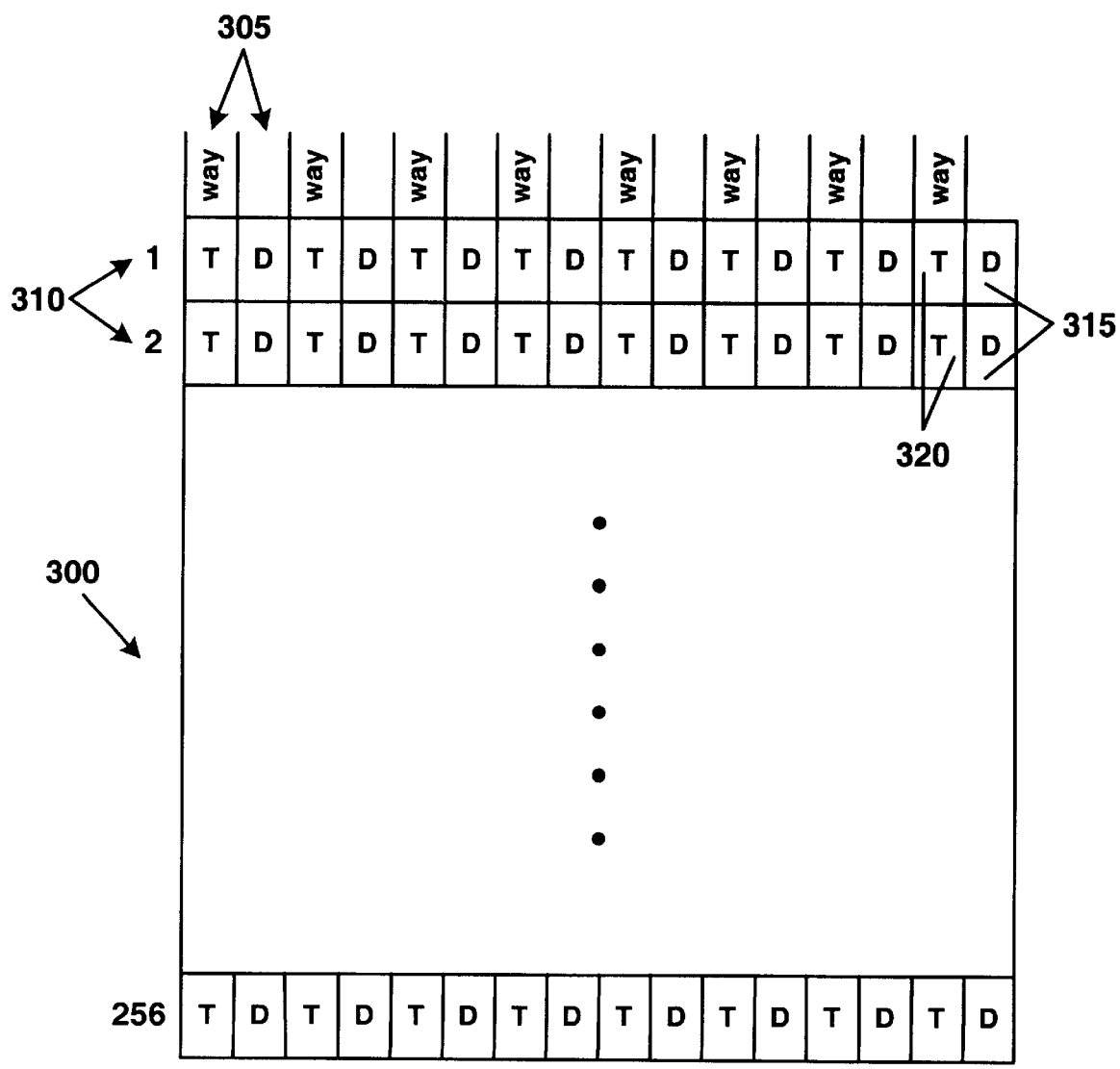
FIG. 3 is a schematic diagram of a trace cache, according to an embodiment of the invention.

FIG. 3 shows an embodiment of an arrangement of information in a trace cache 300. In this example, a trace cache 300 is illustrated as containing 256 rows of addressable data entries (rows 1, 2, and 256 are shown in FIG. 1, with dots indicating that the same pattern continues with the rows that are not displayed). Within each row 310 is an alternating sequence of tags 320, shown represented by "T," and associated data entries 315, shown represented by "D." As shown in FIG. 1 the term "way" refers to each vertical column 305 of tags 320 in the trace cache 300. In the embodiment shown in FIG. 3, each row contains eight ways. Each data entry 315 is addressable via its associated tag 320 (e.g., a 24 bit identifier), and each row in the trace cache may be identified and accessed using a row or "set" address.

A "mini-tag" is an abridged version of the full tag discussed above. In the example of a 32 bit address scheme, a mini-tag may be implemented, for example, by designating bits 2–4 and 12–14 of a tag address as the bits of the mini-tag. The mini-tag can thus be realized by taking, for example, six bits from the full tag to make a partial tag. By using a mini-tag in the trace cache reading operations, it is not required to read out every data entry of an accessed row 310. Therefore, for example, a 32-bit address is not required to perform the data accessing operations, and the mini tag can be compared to only a portion of a requested address. By avoiding the need to perform a tag comparison operation that requires the reading out of every data entry in a particular trace cache row, the time and power required to perform trace cache read operations may be reduced.

Figure 4:
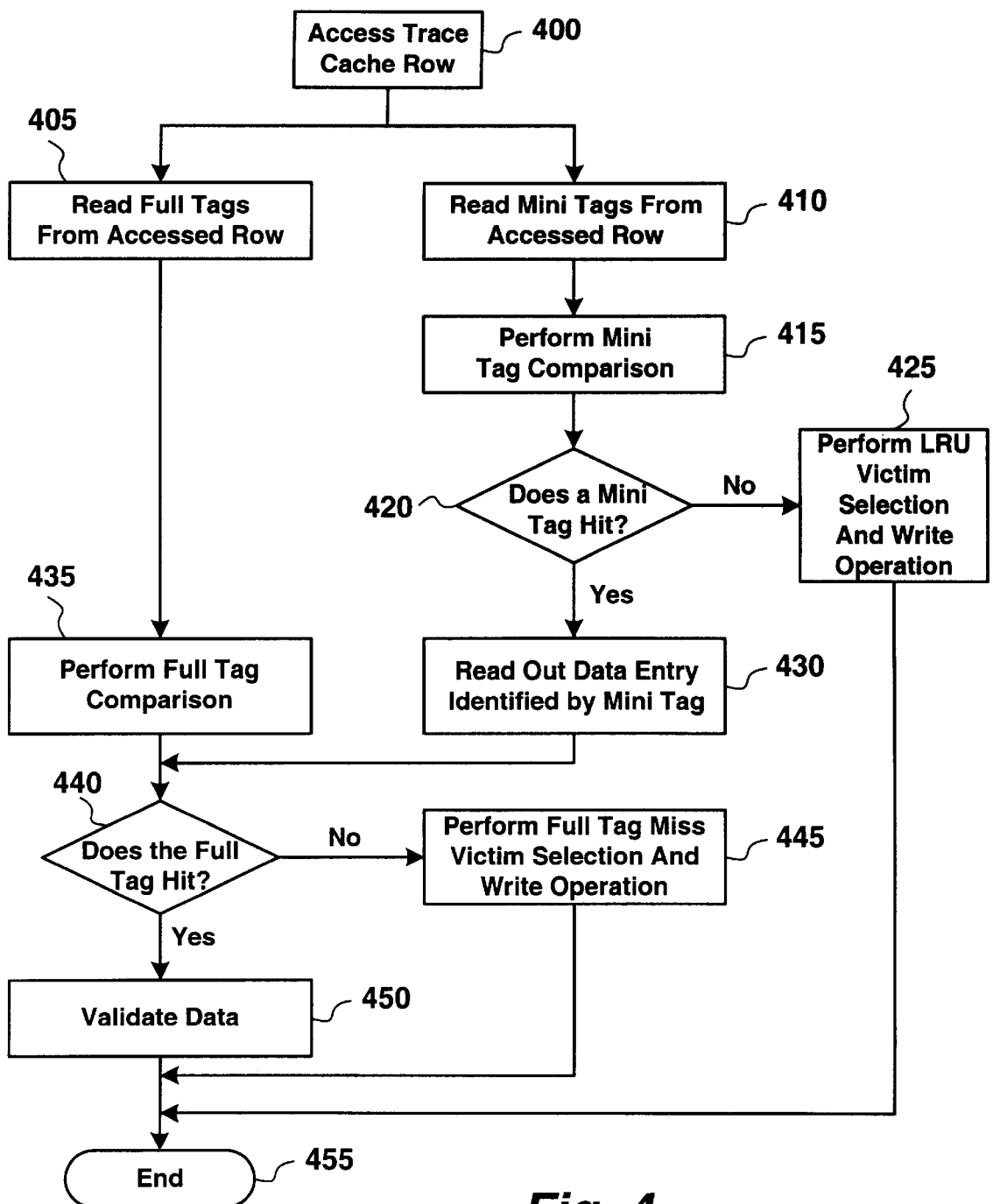
FIG. 4 is a flow diagram representing the steps of a trace cache read operation, according an embodiment of the invention.

FIG. 4 illustrates a flow diagram representing the steps of a trace cache read operation, according to an embodiment of the invention. The process is initiated, for example, when the processor of a computer system is required to perform a data read operation. This "requested data" may be identified by a "requested address." The requested address may include, for example, a set address used to identify a row of the trace cache, and a requested tag used to identify the location of the requested data within the identified row. As with prior read operation techniques, in step 400 the read operation according to the present invention begins with the use of the set address to access one of the rows 310 in the trace cache 300. In step 405, the full tag for each way in the accessed row 310 is read. For example, all eight ways, but not the associated data entries, may be read from the accessed row 310. In step 410, the mini-tags of the accessed ways are read from the accessed row. These read operations (steps 405, 410) may, for example, be performed in parallel (i.e., at the same time). When read from the trace cache 300, the tags and mini-tags may be stored, for example, in a latch before being sent to a comparator.

In step 415, the mini-tags are compared against the selected portions of the requested address. The mini-tags may be used to estimate the particular one of the, for example, eight ways in the trace cache identifying where the desired data entry is located. In step 420, it is determined whether a "hit" occurs with a mini-tag of the row 310 being tested (i.e., whether the mini-tag matches the select portion of the requested address). If no mini-tag hit occurs in a row 310, a true "least recently used" ("LRU") victim selection and write operation is performed in step 425. This technique will be described in more detail below, in connection with FIG. 8. If a mini-tag hit occurs in step 420, the data entry identified by the mini-tag is read out (e.g., to a latch) in step 430, since the presence of the desired information in the selected row 310, though not yet assured, may be determined as more likely.

A full tag comparison is performed in step 435, in order to ensure that the desired information is in fact in this row 310. This step may be performed, for example, in parallel with the read out of the data entry performed in step 430. Therefore, time (and consequently power) may be saved. In step 440, it is determined whether the full tag hit. If both the full tag and the mini-tag have hit, then the previously read out data entry is validated (e.g., by setting a validation bit) in step 450 and the data is allowed to pass through to the processor. The processor may then proceed to the next trace cache read operation. If the full tag misses, then a "full tag miss" victim selection and write operation is performed in step 445. This operation will be explained below in connection with FIG. 9. The trace cache read operation terminates in step 455.

Figure 5:
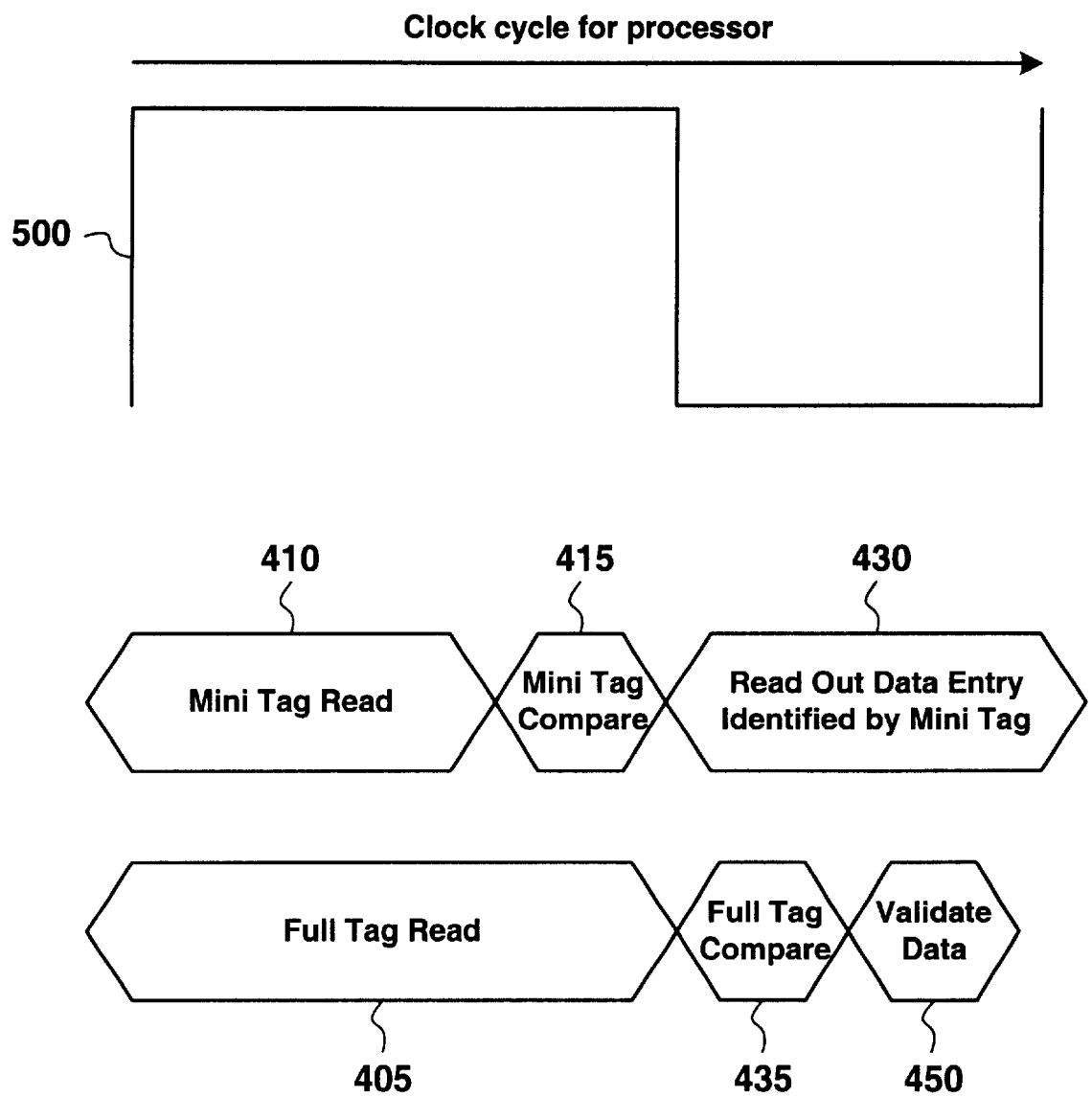
FIG. 5 is a time flow diagram showing elements of the trace cache read operation of FIG. 4.

FIG. 5 is a time flow diagram showing elements of the trace cache read operation of FIG. 4. Certain steps of the process of FIG. 4 are shown, along with a representation of a clock cycle 500 of a processor to illustrate the time sequence of an embodiment of the invention. As shown in the embodiment of FIG. 5, the mini-tag read operation 410 and the mini-tag compare operation 415 are performed in parallel with the full tag read operation 405, as described in connection with FIG. 4. These operations may be performed, for example, in the first half of a processor clock cycle. In the second half of the processor clock cycle 500, for example, the data read out operation 430 may be performed in parallel with the full tag compare operation 435. The data validation operation 450 is performed after the full tag compare, if the full tag compare returns a hit.

In this embodiment as shown in FIG. 5, the system does not need to wait for a time consuming full tag read to read out the data entry. Furthermore, the system does not need to perform a power-consuming read out of all the data entries for the selected row of the trace cache. Therefore, both time and power consumption may be reduced.

According to the embodiment described above, each mini-tag is unique. In order to ensure the uniqueness of each mini-tag, a "victim selection" operation may be performed. When a processor performs the trace cache read operation as discussed above, it continues to do so as long as the mini-tags and full tags involved in the operation continue to hit. When a full tag miss occurs, however, the processor fetches the desired data from another data storage resource (e.g., main memory, disk drive, CD ROM) and writes the data into the trace cache. Since the trace cache most likely will not have an empty storage location for this new data, some portion of the data in the trace cache will need to be written over. The "victim selection" process determines which data entry ("victim") is to be written over with the new data entry.

Figure 6A:
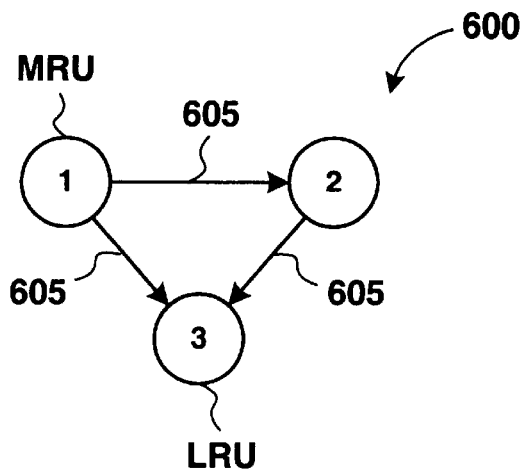
FIG. 6a is a logical diagram illustrating relationships between three "ways" in a first state, according to an embodiment of the invention.

One way to perform a victim selection is to overwrite the least recently used ("LRU") way. The trace cache may include, for example, in the trace cache that keeps track of the LRU way by mapping not only the LRU way for each row, but also the most recently used ("MRU") way as well. In order to better explain this operation, reference is made to the diagram of FIGS. 6a and 6b. These figures show a logical representation of the contents of an LRU/MRU unit 600. Each circled number in this diagram represents a particular way. For simplicity, only three ways are illustrated. In FIG. 6a, the LRU is way 3 and the MRU is way 1. Each line between the ways is an edge 605 representing a relationship. For an edge 605 between two particular ways, the arrow for the edge 605 points away from the more recently used and toward the lesser recently used. Therefore, for the LRU 3, the arrow of each edge 605 emanating therefrom points away from way 1 and way 2 and for the MRU, the arrows of each edge 605 emanating therefrom points to way 2 and way 3. In a logic diagram such as FIG. 6a, an arrow pointed in one direction may be represented, for example, by a binary digit 1, and an arrow pointed in the opposite direction may be represented by a binary digit 0.

Figure 6B:
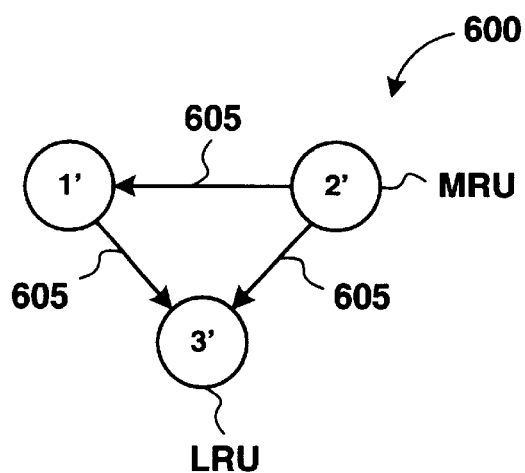
FIG. 6b is a logical diagram illustrating relationships between three "ways" in a second state, according to an embodiment of the invention.

Thus, in FIG. 6a, since the edges 605 of way 1 all point away from way 1, it can be identified as the MRU, and since the edges of way 3 all point to way 3, it can be identified as the LRU. If a hit is received on way 2, however, way 1 is no longer the most recently used way. Consequently, the processor adjusts the mapping in the LRU component of the trace cache. In particular, the edge 605 pointing in FIG. 6a from way 1 to way 2 is reversed, so that way 2 can be identified as the MRU way. This situation is shown in FIG. 6b with ways 1', 2', and 3'. If the number of ways is increased to eight, then 28 edges would be required to characterize the relationships existing among the ways of each row in the trace cache. By constantly adjusting these relationships for each hit and maintaining them mapped in the LRU component of the trace cache, the processor will be able to access the information necessary to perform a victim selection. For a trace cache that, for example, contains 8 ways for each row, the LRU component stores, for example, 28 bits for each such row.

A write operation may be performed when a tag operation misses and an instruction is fetched from a source other than the trace cache. This can happen in two situations: first, when the mini-tag misses (and, therefore the full tag would also miss), and second, when the mini-tag hits but the full tag misses. Before writing into the trace cache, a victim selection must be performed in order to determine which way will have its associated data entry written over. If the mini-tag hits but the full-tag misses, the victim will be the way that the mini-tag hit on, according to the "full tag miss" victim selection procedure. The mini-tag is selected as the victim in this situation in order to maintain the uniqueness of the mini-tags. In order to illustrate the principle, reference is made to FIG. 7.

Figure 7:
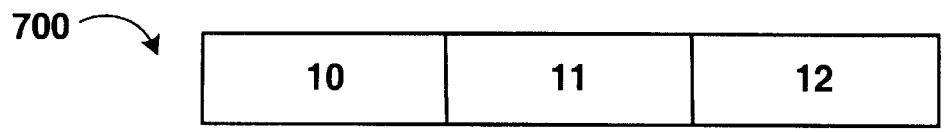
FIG. 7 is a schematic diagram of a row of a trace cache containing three ways, according to an embodiment of the invention.

FIG. 7 illustrates a logical example of a row 700 of a trace cache containing only three ways 10, 11, 12. For the purposes of this illustration, the full number shown in each way 10, 11, 12 represents a full tag and the second digit of this number 10, 11, 12 corresponds to a mini-tag. If a requested address 20 is used as the basis of a multi-tag comparison, there will be a mini-tag hit with respect to way 10, because the second digits of both this way and the requested address are the same. Nevertheless, a full tag miss will occur because the first digits of these addresses (the numbers 1 and 2) do not match.

According to an embodiment of the invention, way 10 will, therefore, be selected as the victim and will be written over with requested address and data corresponding to requested address 20 will be written into the data entry identified by the way 10 that is overwritten. The uniqueness of the mini-tags will be ensured because after the writing operation is performed, there will still only be one way with a mini-tag of zero. Had the address 20 been written into any other location, the mini-tag would have been duplicated and its uniqueness eliminated.

Figure 8:
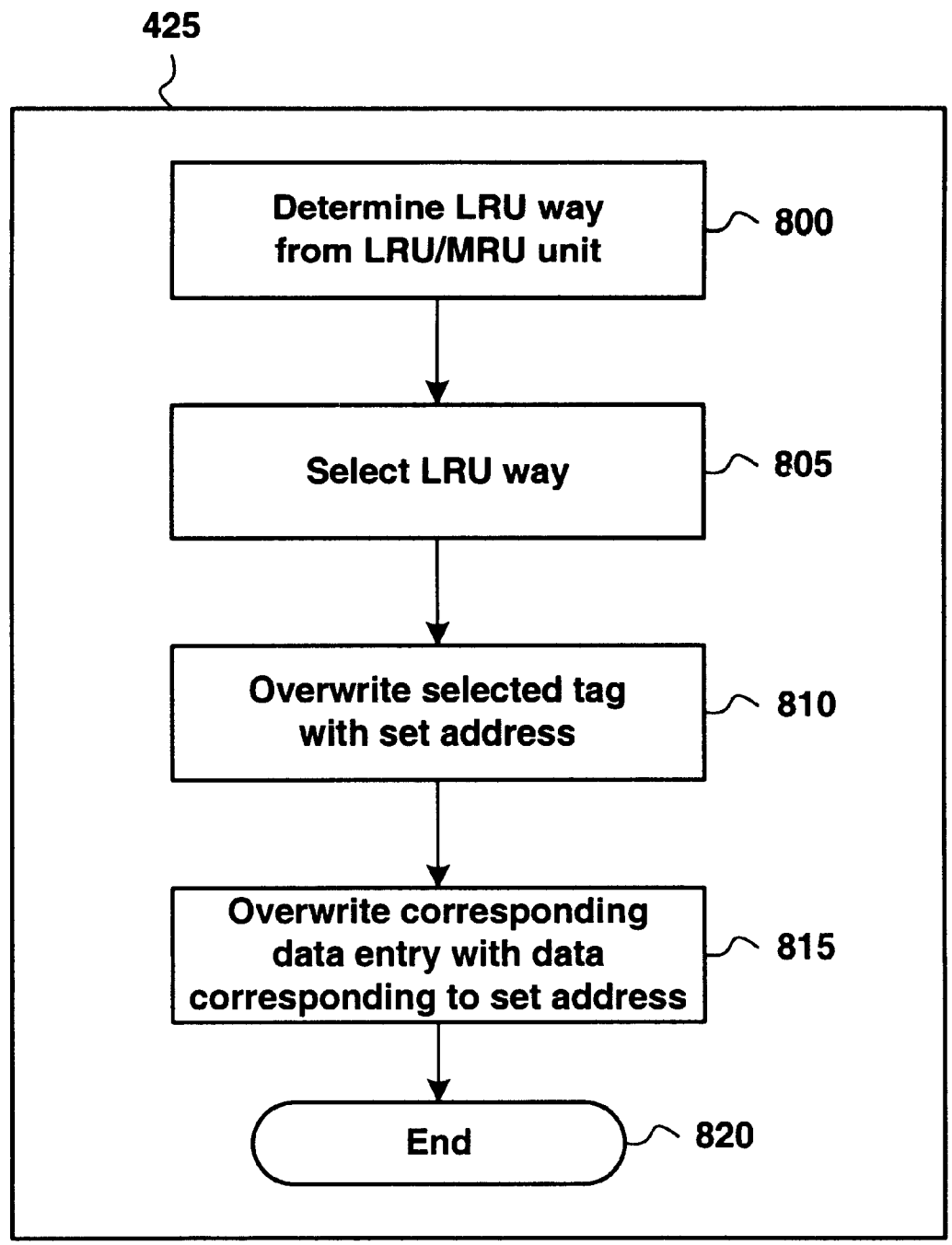
FIG. 8 is a flow diagram showing the steps of a least recently used ("LRU") victim selection and write operation, according an embodiment of the invention.

FIG. 8 shows the true LRU victim selection and write step 425 of FIG. 4 in more detail. This LRU victim selection and write method is a true LRU method, as opposed to the pseudo LRU method described in association with the prior art. When a miss occurs because both the mini-tag and the full tag missed, then the victim to be written over corresponds to the LRU way 3 for that row, which can be determined by looking it up in the LRU/MRU unit 600 of the trace cache in step 800. Once the LRU way 3 is determined, it is selected in step 805, and overwritten in step 810, for example, with the requested address that the mini-tags were being compared to. In step 815, the data entry corresponding to the LRU way is overwritten with the data corresponding to the requested address that was written into the LRU way 3. The LRU victim selection and write operation terminates in step 820.

Figure 9:
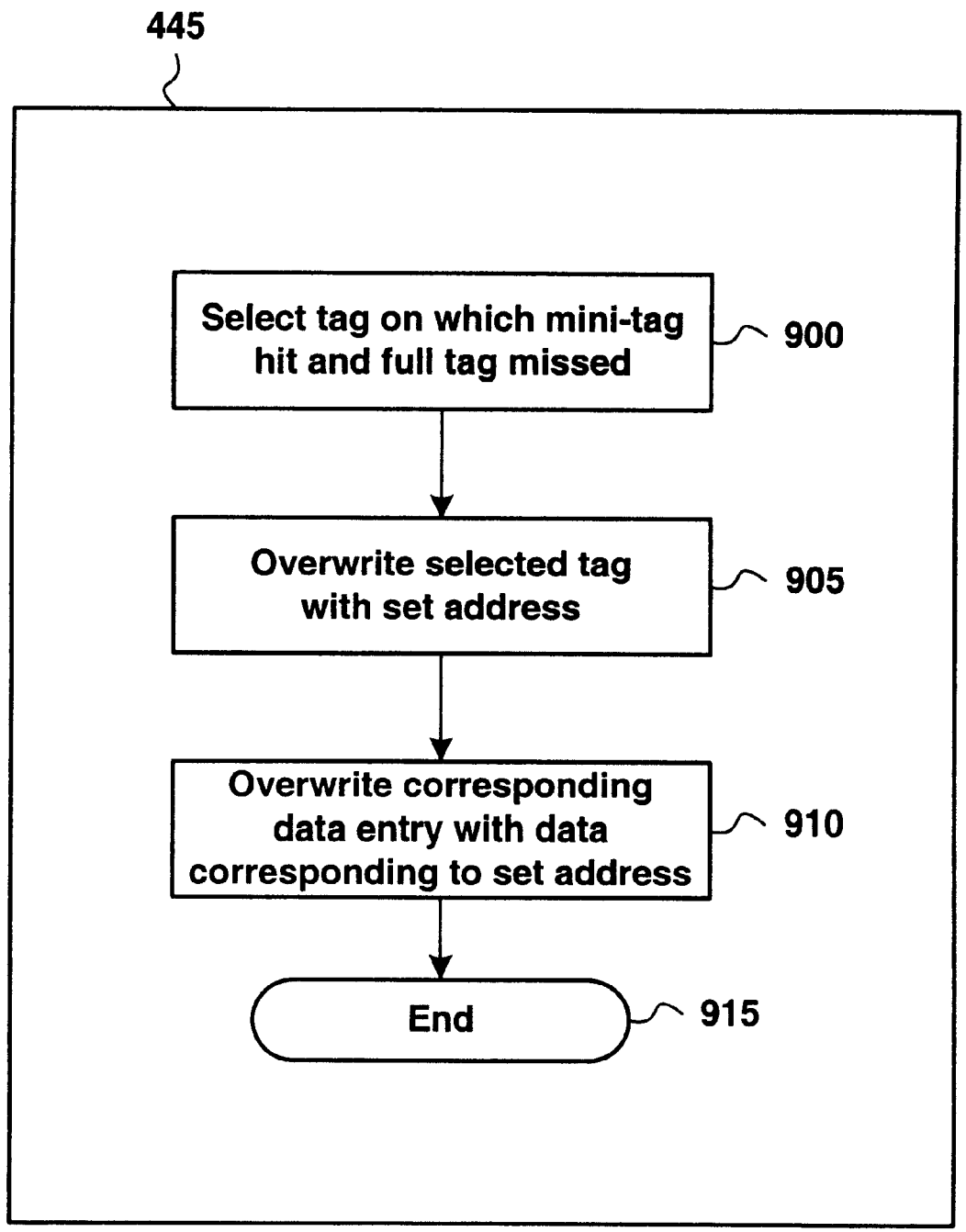
FIG. 9 is a flow diagram showing the steps of a missed tag victim selection and write operation, according to an embodiment of the invention.

FIG. 9 shows the "full tag miss" victim selection and write operation step 445 of FIG. 4 in more detail. In step 900, the way representing the mini-tag that was a hit, but having a full tag that was a miss is selected. The selected way is overwritten with the requested address being used to compare to the tags to determine a hit or a miss in step 905. In step 910, the data entry corresponding to the selected way is overwritten with the data corresponding to the requested address that was written into the selected way. The "full tag miss" victim selection and write operation terminates in step 915. Thus, by maintaining the uniqueness of each mini-tag, the processor may rely on the mini-tags to perform the read operation described above and thereby conserve time and power when accessing the trace cache.

Although an embodiment is specifically illustrated and described herein, it is to be appreciated that modifications and variations of the present invention are covered by the above teachings and are within the purview of the appended claims, without departing from the spirit and intended scope of the invention. It is to be understood, for example, that elements of the present invention may be implemented in hardware, software, or any combination thereof. One skilled in the art will also appreciate that the term "data" used throughout the application can include control information, address information, instructions, micro-operations ("micro-ops"), and other such information. Furthermore, although an embodiment is described for a trace cache, the invention can be implemented with any type of cache in a processor/cache system.

What is claimed is:

1. A method for reading data from a cache comprising:
   reading a plurality of mini-tags from the cache;
   reading a plurality of full tags from the cache;
   comparing individual mini-tags of said plurality of mini-tags to a requested address;
   comparing individual full tags of said plurality of full tags to the requested address; if one mini-tag of said plurality of mini-tags hits,
   reading from the cache a data entry identified by the one mini-tag; and
   if one full tag of said plurality of full tags also hits, allowing the data entry to pass; if one mini-tag of said plurality of mini-tags hits, but none of said plurality of full tags hits,
   performing a victim selection and write operation.

2. The method of claim 1, wherein:
a reading of a group of mini-tags from the cache is performed in parallel with a reading of a group of full tags from the cache.

3. The method of claim 2, wherein:
a comparison of mini-tags to a requested address is also performed in parallel with the reading of a group of full tags from the cache.

4. The method of claim 1, wherein:
reading from the cache a data entry identified by the one mini-tag is performed in parallel with comparing the individual full tags to the requested address.

5. The method of claim 1, wherein the method is performed in one processor clock cycle.

6. The method of claim 1, further comprising:
validating the data before allowing the data entry to pass.

7. The method of claim 1, wherein performing the victim selection and write operation includes:
selecting a full tag corresponding to the one mini tag that hit; and
overwriting the selected full tag with at least a portion of the requested address.

8. The method of claim 1, further comprising:
if no mini-tags hit, performing an LRU victim selection and write operation by:
determining a least recently used way identified by a least recently used full tag by accessing an LRU/MRU unit; and
overwriting the least recently used full tag with at least a portion of the requested address.

9. A processor/cache system comprising:
a processor;
a cache including:
data entries;
full tags identifying the data entries;
mini-tags, each mini-tag comprising a portion of a full tag;
the processor to:
read a plurality of mini-tags from the cache;
read a plurality of full tags from the cache;
compare ones of said mini-tags to a requested address;
compare ones of said full tags to the requested address;
read from the cache a data entry identified by a mini-tag, if one of said plurality of mini-tags hits; and
allow the data entry to pass, if one of said plurality of full tags also hits; and
perform a victim selection and write operation, if one of said plurality of mini-tags hits, but none of said plurality of full tags hits.

10. The processor/cache system of claim 9, where the processor is to further:
perform the read of a group of mini-tags from the cache in parallel with the read of a group of full tags from the cache.

11. The processor/cache system of claim 10, where the processor is to further:
perform the comparison of the mini-tags to a requested address in parallel with the read of the group of full tags from the cache.

12. The processor/cache system of claim 9, where the processor is to further:
perform the data entry read from the cache in parallel with the comparison of the full tags to the requested address.

13. The processor/cache system of claim 9, where the processor is to further:
validate the data before allowing the data entry to pass.

14. The processor/cache system of claim 9, wherein the victim selection and write operation is performed by:
selecting the full tag corresponding to the mini tag that hit; and
overwriting the selected full tag with at least a portion of the requested address.

15. The processor/cache system of claim 9, further comprising:
an LRU/MRU unit;
where the processor is to further:
perform an LRU victim selection and write operation, if no mini-tag hits, by:
determining a least recently used way identified by a least recently used full tag, by accessing the LRU/MRU unit; and
overwriting the least recently used full tag with at least a portion of the requested address.

16. A method for reading data from a cache comprising:
reading a plurality of mini-tags from the cache in parallel with reading a plurality of full tags from the cache;
comparing individual mini-tags of said plurality of mini-tags to a requested address; if one mini-tag of said plurality of mini-tags hits,
reading from the cache a data entry identified by the one mini-tag in parallel with comparing one full tag of said plurality of full tags to the requested address; and if one full tag of said plurality of full tags also hits, validating the data entry; if one mini-tag of said plurality of mini-tags hits, but no full tags hit,
performing a victim selection and write operation.

17. The method of claim 16, wherein performing the victim selection and write operation includes:
selecting a full tag corresponding to the mini tag that hit; and
overwriting the selected full tag with at least a portion of the requested address.

* * * * *